Patented July 6, 1926.

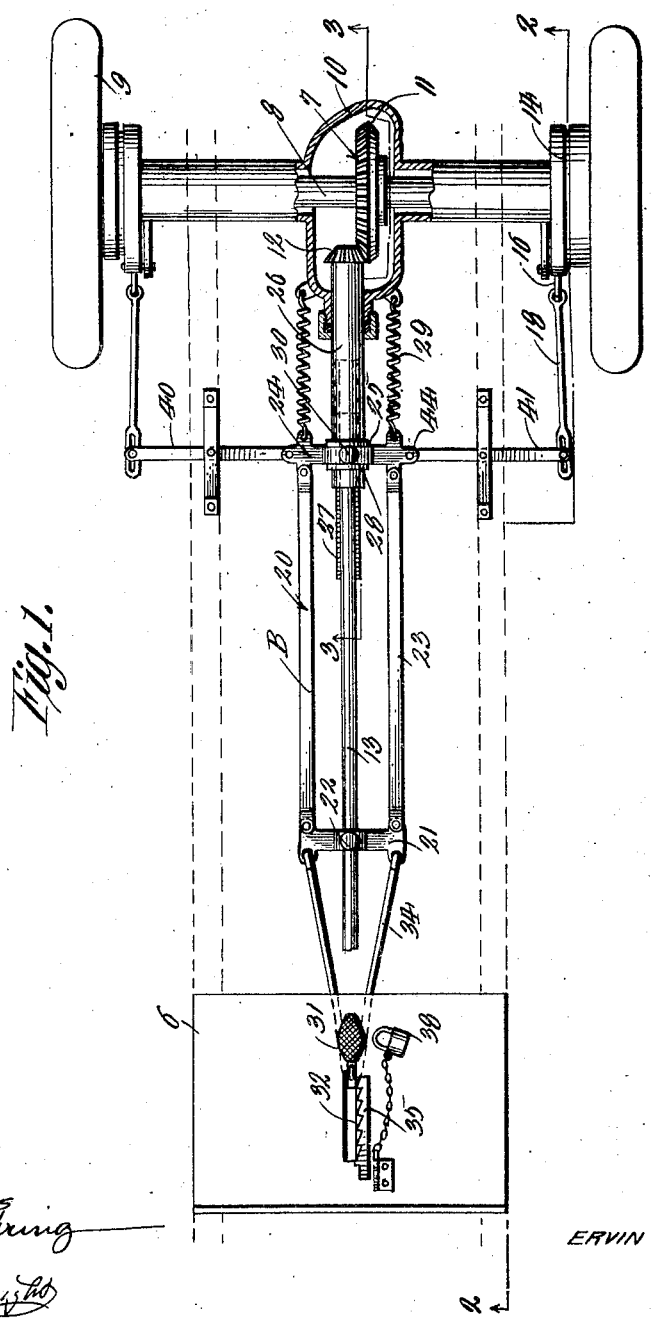

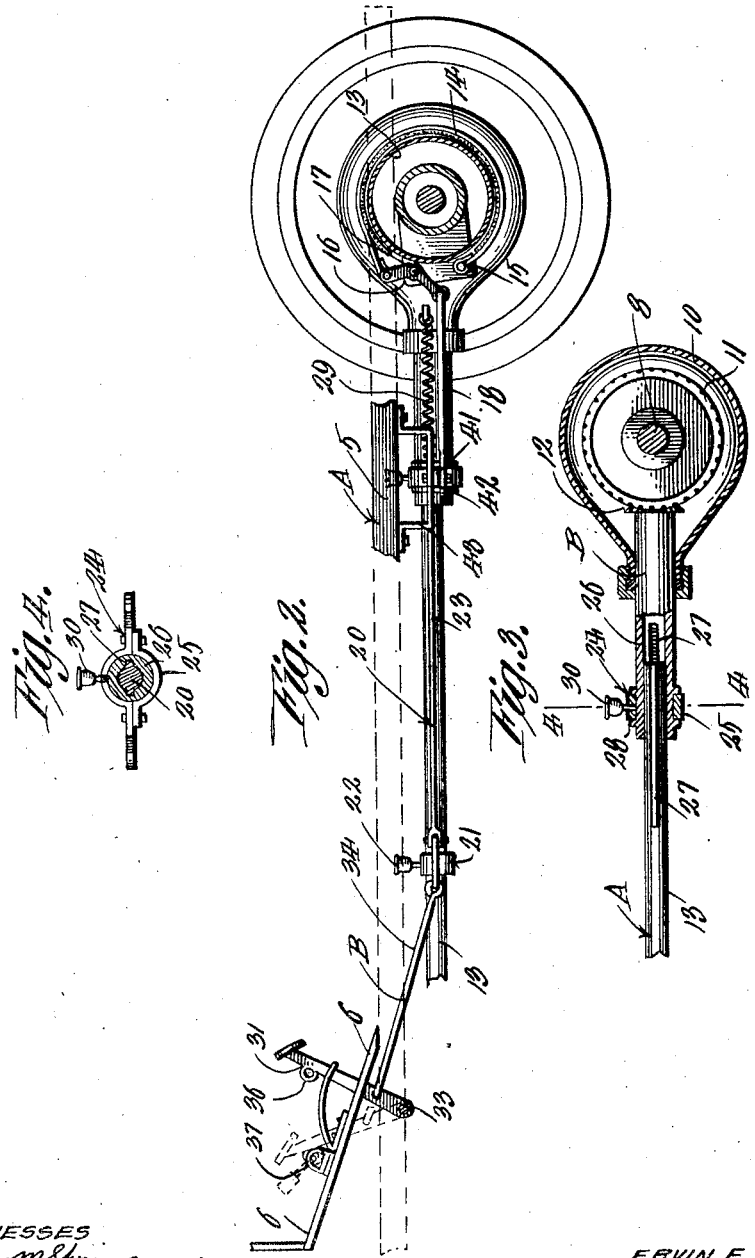

1,591,495

UNITED STATES PATENT OFFICE.

ERVIN E. MILLER, OF CLEVELAND, OHIO.

ANTITHEFT DEVICE.

Application filed February 17, 1925. Serial No. 9,856.

This invention appertains to automobile attachments and the primary object of the invention is to provide novel means for rendering an automobile inoperative at the option of the owner thereof, thereby effectively preventing the theft of the automobile and the use thereof by unauthorized persons.

Another object of the invention is the provision of novel means for manually moving the driving pinion of the differential out of engagement therewith and novel means for holding the driving pinion out of its driving position, said means embodying a key operated lock.

A further object of the invention is the provision of means located adjacent to the driver's seat of the vehicle for moving the driving pinion out of meshing engagement with the differential mechanism and novel brake actuating means operatively connected thereto, whereby the brakes will be automatically set when the driving pinion is moved to its inoperative position.

A further object of the invention is the provision of a foot pedal carried by the floor board of the vehicle for moving the driving pinion out of engagement with the differential, spring means normally urging the pinion into meshing engagement with the differential and means for locking the foot pedal in its forward position for holding the driving pinion out of engagement with the differential against the tension of said spring means.

A still further object of the invention is to provide an improved anti-theft device for automobiles of the above character, which will be durable and efficient in use, one that will be simple and easy to manufacture, and which can be incorporated with an automobile and placed upon the market at a small cost.

With these and other objects in view, the invention consists in the novel construction, arrangement and formation of parts, as will be hereinafter more specifically described, claimed and illustrated in the accompanying drawings, in which drawing:—

Figure 1 is a fragmentary plan view of a chassis of an automobile showing parts thereof broken away and in section with the improved anti-theft device incorporated therewith.

Figure 2 is a fragmentary longitudinal section with a portion of the automobile chassis showing the improved anti-theft device incorporated therewith.

Figure 3 is a detail longitudinal section illustrating the novel means for incorporating the driving pinion with the drive shaft taken on the line 3—3 of Figure 1, and Figure 4 is a detail section taken on the line 4—4 of Figure 3.

Referring to the drawing in detail, wherein similar reference characters designate corresponding parts throughout the several views the letter A generally indicates an automobile and B the improved safety appliance therefor.

The automobile A can be of any preferred type or make and only a sufficient portion thereof has been shown to illustrate the operation of the improved anti-theft device. As shown the automobile A includes the usual side channel beams 5, the floor board 6, the differential 7, the drive axle shaft sections 8 and the wheels 9 connected with said axle shaft sections. The differential 7 is housed in the usual differential casing 10 and includes a differential ring gear 11, which can be driven by the usual drive pinion 12. The drive shaft 13 of the automobile extends longitudinally thereof toward the differential as in the usual construction. The wheels 9 have associated therewith in the ordinary manner the brake drums 13 which are adapted to be engaged by the brake bands 14. As shown each brake band has one end anchored as at 15 to a stationary portion of the chassis and an opposite end connected to the outer end of one arm of the bell crank 16, which is pivoted at its angle as at 17 to a stationary portion of the vehicle. The outer terminals of the other arms of the bell cranks 16 have connected thereto forwardly extending links 18 which form a part of a novel device B as will be hereinafter more fully described.

The improved anti-theft device B comprises a sliding frame 20 which includes a yoke 21 slidably upon the drive shaft 13 adjacent to the forward end thereof. The yoke 21 permits of the ready rotation of the drive shaft and the yoke can be provided with an oil cup 22 if preferred. Rearwardly extending arms 23 are connected with the yoke 21 and the rear terminals thereof are connected to a second yoke 24 which includes a collar 25 for rotatably receiving a hollow shaft 26. The rear end of the hollow shaft 26 has keyed or otherwise secured thereto the drive pinion 12 and the shaft 26 receives the rear end of the drive shaft 13 and this sleeve is feathered on the drive shaft 13 to permit the hollow shaft 26 to slide longitudinally thereon. As shown the drive shaft 13 is provided with radially extending ribs 27 which fit in longitudinally extending side grooves 27 formed in the inner wall of the hollow shaft 26. Stop collars 28 are secured to the hollow drive shaft 26 for movement therewith and these collars are disposed on each guide of the collar 25. By this construction it is apparent that upon movement of the frame 20 that the pinion 12 will be moved therewith.

In order to insure the proper meshing engagement of the drive pinion 12 with the ring gear 11 to the differential 7, relatively heavy contractile springs 29 are arranged on each side of the hollow shaft 26 and these springs have their rear terminals anchored to the differential housing 10 and their forward ends anchored to the rear yoke 24. If preferred an oil cup 30 can also be carried by the collar 25 in order to permit the free rotation of the hollow shaft 26 within said collar. The frame 20 is preferably moved longitudinally of the automobile by the use of a suitable foot pedal 31, which I have shown as extended through a slot 32 in the floor board 6 of the vehicle A. This pedal 31 can be rockably mounted from its lower end upon a suitable shaft or pivot pin 33 as clearly shown in Figure 2 of the drawing. Directly above the pivot point of the pedal 31, the pedal has connected thereto rearwardly extending diverging links 34 which have their rear terminals pivotally connected to the opposite side of the yoke 21, as can be readily seen by referring to Figure 1 of the drawing. A segmental rack bar 35 can be disposed adjacent to the floor slot 32 in order to hold the pedal 31 in an adjusted position.

When the pedal 31 is pressed forwardly the whole frame 20 will also be moved forwardly carrying the pinion 12 out of meshing engagement with the differential. This will render the vehicle inoperative. In order to prevent the operation of the pedal 31 by an unauthorized person, when drive pinion 12 is moved out of engagement with the differential, the foot pedal 31 is provided with a rigid eye 36 which is adapted to aline with an eye 37 rigidly carried by the floor board 6 of the vehicle when the pedal 31 is in its extreme forward position. The shackle of a suitable padlock 38 is adapted to be placed through eyes as is readily apparent. In order to operate the brake when the drive pinion 12 is moved out of meshing engagement with the differential the double ended levers 40 and 41 are disposed on each side of the yoke 24 and these levers are pivotally mounted at a point intermediate their ends upon suitable pivot pins carried by suitable brackets 43 rigidly secured to side channel beams 5 of the vehicle. The inner ends of these levers 40 and 41 are pivotally connected as at 44 to the opposite sides of the rear yoke 24. The outer ends of the levers are pivotally connected to the rearwardly extending links 18 heretofore described. By this construction, when the frame 20 is shifted forwardly by the foot pedal 31 the levers 40 and 41 will be rocked upon pivots 42, which will move the link 18 rearwardly causing the operation of the bell cranks 16 and applying of the brake bands to the drums.

The improved device can also be used for quickly stopping a vehicle in cases of emergency and it is obvious that with one operation of the foot pedal, the rear axle shaft is disconnected from the drive mechanism therefor and the brakes will be applied.

Changes in details may be made without departing from the spirit or scope of this invention but—

What I claim as new is:—

1. The combination with an automobile having a brake and a differential, the differential embodying a drive pinion, of an attachment for the automobile embodying means for synchronously applying the brake and moving the drive pinion out of driving engagement with the differential.

2. In an autmobile, a differential embodying a drive pinion, a hollow shaft, a drive shaft, means feathering the hollow shaft upon the drive shaft, the drive pinion being secured to the hollow shaft, a foot pedal and means operatively connecting the foot pedal with the hollow shaft for permitting the same to be drawn forwardly and the drive pinion out of engagement with the differential.

3. In an automobile, a differential including a ring gear and a drive pinion, a drive shaft and brakes including brake drums and brake bands, a hollow shaft feathered upon the drive shaft, a foot pedal, means operatively connecting the foot pedal with the hollow shaft, the drive pinion being secured to the hollow shaft, and means for locking the foot pedal against movement by an unauthorized person when the hollow shaft is moved forwardly and the drive pinion out of meshing engagement with the differential ring gear.

4. In an automobile embodying a differential, a drive pinion for the differential and wheel brakes, of an attachment for the vehicle embodying a foot pedal and means for applying the brakes and for moving the pinion out of driving engagement with the differential from said foot pedal.

5. In a vehicle including a drive shaft, a differential, a drive pinion for the differential and wheel brakes, of an attachment for the vehicle embodying a frame slidably mounted upon the drive shaft, a hollow shaft carried by said frame and feathered on the drive shaft for rotation therewith, the drive pinion being connected with the hollow shaft for movement therewith, spring means engaging the frame normally urging the frame rearward and the pinion in driving engagement with the differential, means operatively connecting the brake with the frame, a single foot pedal, and means operatively connecting the frame with the foot pedal to permit movement of the frame upon operation of said pedal.

6. The combination with a vehicle embodying a differential, a drive pinion for the differential, a drive shaft, of an attachment for the vehicle embodying a sliding frame slidably mounted relative to the drive shaft, a hollow shaft carried by the frame feathered upon the drive shaft and carrying said pinion, spring means normally urging the frame rearward and the pinion in meshing engagement with the differential, a single foot pedal pivoted at its lower end for rocking movement, links connected to the frame and to the pedal above the pivot point thereof and means for locking the foot pedal against movement when the same is in its extreme forward position for sliding the frame forward and the drive pinion out of meshing engagement with the differential including eyes carried by the pedal and a rigid portion of the vehicle adapted to aline when the pedal is in its extreme forward position and a padlock for engaging said eyes.

7. The combination with an automobile embodying a drive shaft, a differential, a drive pinion for the differential and wheel brakes including brake bands having one of their terminals anchored to a rigid portion of the vehicle and their opposite terminals connected to the outer terminals of the arms of the bell cranks, means pivotally connecting the bell cranks at their angles to the rigid portion of the vehicle, forwardly extending links pivotally connected to the outer terminals of the other arms of the bell cranks, of an attachment for the vehicle comprising a frame mounted for sliding movement longitudinally of the automobile and the drive shaft, a hollow shaft rotatably carried by the frame for sliding movement with the frame feathered upon the drive shaft and carrying said pinion, spring means connecting the sliding frame with the vehicle for normally urging the frame rearward and the pinion in driving engagement with the differential, a foot pedal, means operatively connecting the foot pedal with the sliding frame, whereby upon movement of the foot pedal the frame will be moved forwardly against the tension of said spring means, double ended levers arranged on each side of the sliding frame and pivotally connected to the vehicle, means pivotally connecting the inner terminals of the double ended levers to the sliding frame, and means pivotally and slidably connecting the outer terminals of the double ended levers to said links.

8. The combination with an automobile having a differential and a drive pinion therefor, of an attachment for the automobile embodying means for moving the drive pinion out of driving engagement with the differential.

In testimony whereof I affix my signature.

ERVIN E. MILLER.